United States Patent [19]

Fletcher et al.

[11] 4,025,783

[45] May 24, 1977

[54] GREGORIAN ALL-REFLECTIVE OPTICAL SYSTEM

[76] Inventors: James C. Fletcher, Administrator of the National Aeronautics and Space Administration, with respect to an invention of William B. King, Torrance, Calif.

[22] Filed: Apr. 28, 1976

[21] Appl. No.: 680,938

[52] U.S. Cl. .............................................. 250/199
[51] Int. Cl.² ......................................... H04B 9/00
[58] Field of Search .................... 250/199; 329/144

[56] References Cited

UNITED STATES PATENTS

| 3,509,347 | 4/1970 | Lang et al. | 250/199 |
| 3,828,185 | 8/1974 | Vandling | 250/199 |

*Primary Examiner*—Richard Murray
*Attorney, Agent, or Firm*—John O. Tresansky; Robert D. Marchant; John R. Manning

[57] ABSTRACT

An optical heterodyne receiver comprises a system of reflectors forming a folded Gregorian configuration for collecting a signal beam, and an optical detector located at the focus of the system. The reflectors comprise a paraboloidal primary reflector and an ellipsoidal secondary reflector facing each other on an optical axis with the focus of the secondary reflector coinciding with the focus of the primary reflector. An auxiliary laser generates a local oscillator beam that is combined with the signal beam after the signal beam emerges from the exit pupil (which is also the aperture stop) of the system, and the resultant is impinged on the detector. A pair of image motion compensators is located as close to the exit pupil as possible for aligning off-axis inputs to the detector. The compensators also ensure that off-axis as well as on-axis inputs are substantially coaxial with the local oscillator beam, thereby maximizing signal detector efficiency. By utilizing a large $f$/number for the local oscillator beam, it effectively eliminates the need for critical alignment between the signal and the local oscillator beams at the detector.

14 Claims, 2 Drawing Figures

U.S. Patent    May 24, 1977    4,025,783
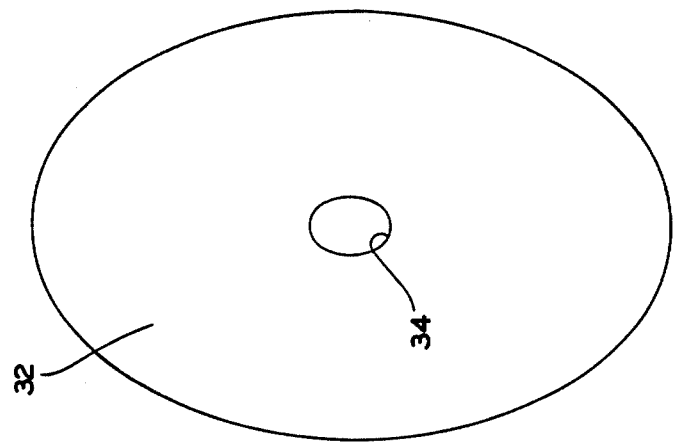
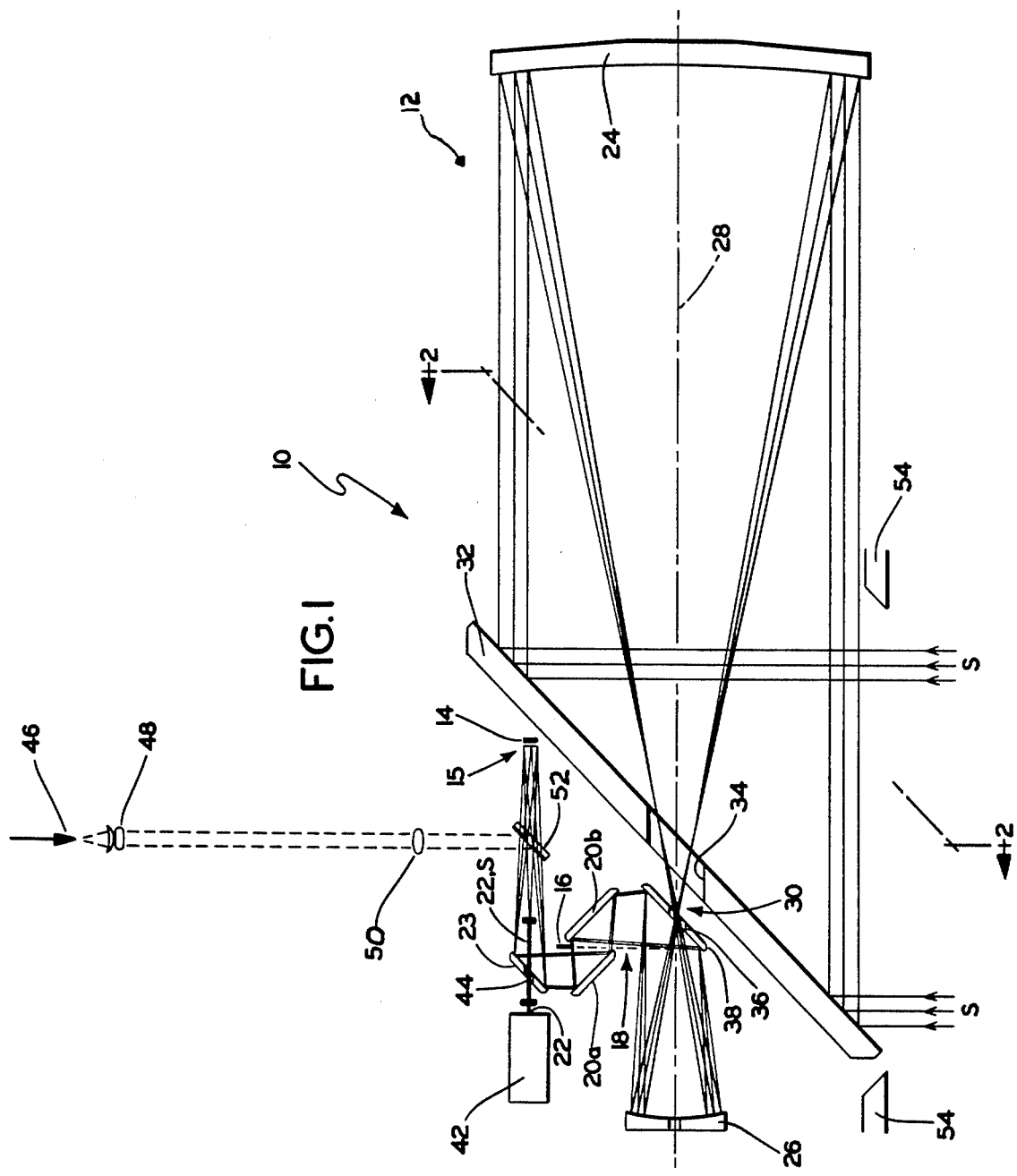

GREGORIAN ALL-REFLECTIVE OPTICAL SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention relates generally to optical laser systems, and more particularly toward a heterodyne laser receiver having folded Gregorian, all-reflective collecting optics.

It has been proposed that communication between data relay satellites as well as between satellites and spacecraft be provided optically using data-modulated laser beams. Each satellite and spacecraft is equipped with a receiver comprising an infrared laser beam detector, and signal beam collecting optics. An incoming laser beam in the infrared region, i.e., having a wavelength of approximately 10 microns, received by the beam collecting optics, is mixed (heterodyned) with a local oscillator beam generated by an auxiliary laser, and the resultant is impinged on a beam detector. The difference between the wavelength of the incoming signal beam and the wavelength of the local oscillator beam is process to extract the data contained in the signal beam.

Coarse pointing of the collecting optics is provided with a gimbal-mounted pointing mirror. For fine pointing, however, image motion compensators are included in the optical path of the collector to align any off-axis incoming signal beam to the beam detector. Image motion compensation is best performed at or very closed to the exit pupil of the collector, and, for maximum detection efficiency, must direct the incoming beam to the detector coaxially with the local oscillator beam. This requires that off-axis as well as on-axis inputs be aligned to the optical axis of the collector at the auxiliary laser.

It has been suggested that Cassegrain collecting optics comprising a paraboloid main reflector confocally oriented with respect to a hyperboloid subreflector be used in conjunction with a laser beam detector. The exit pupil in the Cassegrain configuration, however, is virtual rather than real. The image motion compensator, accordingly, cannot be located within the Cassegrain configuration without the addition of a refractive optical relay system. It is undesirable to include a refractive lens in the system, because a refractive lens is wavelength dependent. This is a serious disadvantage because data relay satellites generally operate at two discrete frequencies (diplexing).

Furthermore, the alignment of the reflectors is very critical to the operation of the system. The collector is preferably tested by supplying light to the collecting optics, and visually monitoring the response. A collector having a refractive lens would have to be tested at the wavelength of actual operation, e.g., infrared for a 10.6 micron wavelength communication system, and it would be impossible to visually determine alignment. It is desirable that the collecting optics be frequency independent so that visible light can be used for testing.

OBJECTS OF THE INVENTION

One object of the present invention is to provide a new and improved optical communication system.

Another object of the present invention is to provide new and improved all-reflective collecting optics for optical communications.

Another object of the present invention is to provide new and improved wavelength independent collecting optics for optical communications.

Still another object of the present invention is to provide new and improved collecting optics for optical communications having a real exit pupil for image motion compensation.

Yet another object of the present invention is to provide a new and improved heterodyne laser receiver having fine pointing introduced into the incoming optical beam close to the exit pupil without interfering with optical heterodyne mixing or causing vignetting.

Another object of the present invention is to provide a new and improved heterodyne laser receiver having minimum spherical aberration and coma over the desired field of view.

Still another object of the present invention is to provide collecting optics for a laser communication system that is compact and visually alignable.

A still further object of the present invention is to provide an optical design which effectively eliminates the need for critical alignment between the signal and the local oscillator beams at the detector.

SUMMARY OF THE INVENTION

In accordance with the invention, a heterodyne laser receiver is provided with a folded Gregorian, all-reflective optical collector, and a pair of image motion compensators located near the real exit pupil (aperture stop) of the collector. A laser beam detector is located at the focus of the Gregorian collector.

The collector comprises a paraboloidal primary reflector facing an ellipsoidal secondary reflector. The primary and secondary reflectors are located along an optical axis, with the focus of the secondary reflector coinciding with the focus of the primary reflector. A planar pointing mirror is located on the optical axis, and contains a central aperture for passing an incoming signal beam between the primary and secondary reflectors. The pointing mirror is nominally oriented at 45° with respect to the optical axis, but is adjustable for coarse pointing.

In order to minimize thermal distortion of the pointing mirror by radiation of the sun, a sun shield is provided at the input of the pointing mirror.

A planar folding mirror is located parallel to the pointing mirror on the optical axis, and also contains a central aperture. The folding mirror folds the optical axis at a right angle with respect to the axis containing the primary and secondary reflectors.

The incoming signal beam is reflected from the pointing mirror to the primary reflector, and then to the secondary reflector through the apertures formed in the pointing mirror and folding mirror. The folding mirror then deflects the beam at a right angle toward an exit pupil.

The pair of image motion compensators is located near the exit pupil symmetrically about the aperture stop of the system (the aperture stop coincides with the exit pupil). The image motion compensators provide fine pointing of the system, and the location of the image motion compensators provides nearly perfect correction of off-axis signal beams, i.e., aligning the off-axis signal beams to the detector.

The output of the image motion compensator is combined with a local oscillator beam generated by an auxiliary laser. The local oscillator beam is diffraction-limited and is coaxial with the relayed optical axis of the receiver optics. To facilitate optical alignment, the equivalent Airy disc size of the local oscillator beam is chosen to be about five times larger than that of the receiver optics. In addition to aligning off-axis beams to the detector, the image motion compensators also align off-axis signal beams coaxially with the local oscillator beam. This maximizes detecting efficiency.

The beam detector is located at the best focal plane of the optical collector. The size of the detector is matched to the diameter of the Airy disc to improve mixing efficiency.

A beamsplitter is provided on the optical axis between the auxiliary laser and the detector for injecting an off-axis beacon signal. The beacon signal is generated by a wide beamwidth, low gain laser beam source, and assists in locating the receiver by a remote signal source, e.g., data relay satellite.

Still other objects and advantages of the present invention will become readily apparent to those skilled in this art from the following detailed description, wherein there is shown and described only the preferred embodiment of the invention, simply by way of illustration of a best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING

The above and other objects and advantages of the invention will appear clearly from the following detailed description and the accompanying drawing, wherein:

FIG. 1 is a diagram of a laser heterodyne receiver employing the principles of the present invention; and FIG. 2 is a view of the pointing mirror taken along the line 2—2 in FIG. 1.

DETAILED DESCRIPTION OF THE PREFERRED EMBODIMENT

Referring to FIG. 1, a laser heterodyne receiver 10 comprises a folded Gregorian, all-reflective optical collector 12, in accordance with the invention, and a laser beam detector 14 located in proximity to the focus 15 of collector 12. The folded Gregorian configuration has an aperture stop 16 coincident with a real exit pupil 18, and a pair of image motion compensators 20a and 20b is located symmetrically about the pupil. A local oscillator beam 22 is mixed with the incoming signal beam through a combining mirror 23. This unique arrangement permits compensation of off-axis incoming signal beams and directs these beams coaxially to the local oscillator beam for impingement on the beam detector 14.

Collector 12 includes a paraboloidal primary mirror 24 and an ellipsoidal secondary mirror 26. Primary mirror 24 and secondary mirror 26 face each other on a common optical axis 28. Mirrors 24 and 26 are spaced apart from each other so as to be confocal, i.e., each has a focus at point 30.

A planar pointing mirror 32 is located on axis 28 between mirrors 24 and 26. The pointing mirror 32 is nominally oriented at an angle of 45° with respect to axis 28, but this angle is variable for coarse pointing with a conventional gimbal mechanism (not shown). The elliptical mirror 32 contains a central aperture 34 on axis 28 (see FIG. 2), and the beam footprint on mirror 32 is elliptical. The function of pointing mirror 32 is to deflect an incoming signal beam S toward the primary mirror 24. The beam S is then reflected from primary mirror 24 and passed through aperture 34 in pointing mirror 32 to the common focus 30 within aperture 36 of a folding mirror 38. The beam diverges from focus 30 to secondary mirror 26, where the beam is reflected to a planar folding mirror 38.

Folding mirror 38 is substantially parallel to pointing mirror 32. The signal beams are reflected from folding mirror 38 toward the real exit pupil 18, which is also aperture stop 16, of the Gregorian system.

Image motion compensator mirrors 20a and 20b are located as close to the aperture stop 16 as possible. This location permits the image motion compensator mirrors 20a and 20b to realign off-axis inputs as closely as possible with the nominal optical axis 28 of collector 12. In practice, it is not possible to locate image motion compensator mirrors 20a and 20b precisely on the aperture stop 16 due to the physical dimensions of the compensators; thus the image motion compensators 20a and 20b are disposed symmetrically about aperture stop 16 as shown in FIG. 1. When an off-axis signal beam is corrected by image motion compensators 20a and 20b, the optical deflection causes a small amount of image defocus at detector 14. Defocusing is minimized, however, by locating compensators 20a and 20b as remote from detector 14 as possible, as shown in FIG. 1.

The incoming signal beam, compensated by image motion compensator mirrors 20a and 20b, is deflected at a right angle by a planar beam combining mirror 23, and the deflected beam is impinged on beam detector 14, located in proximity to focus 15 of optical collector 12.

Auxiliary laser 42, positioned behind beam combining mirror 23, generates a local oscillator beam 22 through a central aperture 44 formed in the beam combining mirror. The frequency of laser beam 22 is very close to the frequency of the incoming signal beam S. In practice, the frequency of local oscillator beam 22 is made to differ from the frequency of incoming beam S by 30 MH$_z$ for processing in conventional R.F. amplification circuitry. Obviously local oscillator beam 22 must be extremely stable, and conventional tracking means is used to track any Doppler shifting (usually in the Gigahertz frequency range). The laser beam 22 is coaxial with respect to the incoming signal beam S, and the combined, coaxial beams S and 22 are detected by the beam detector 14. The combined beams, impinging on detector 14, have sum and difference signal components, but signal processing circuitry (not shown), responsive to the output of detector 14, retains only the difference signal component; the sum signal is filtered out.

Of particular importance, the signal beam reflected from beam combining mirror 23, is coaxial to the local oscillator beam 22, and this is true even for off-axis, incoming rays. This characteristic of the present invention maximizes the detecting efficiency of detector 14, and is made possible by the novel configuration of collector 12, particularly the location of image motion compensator mirrors 20a and 20b at the combined real exit pupil 18 and aperture stop 16 of the collector 12.

In order to maximize the efficiency of mixing of the incoming signal beam S and local oscillator beam 22, the size of the detector 14 is matched to the diameter of the Airy disc (not shown) at the focus 15 of collector 12. In practice, if the size of detector 14 is matched to an Airy disc of an f/8 signal beam and, by utilizing a coaxial f/40 local oscillator, a mixing efficiency that is 50% of the theoretical maximum is achieved. However, it has been determined that if the diameter $D_d$ of detector 14 is made slightly smaller than the diameter $D_A$ of the Airy disc ($D_d \approx 0.72\ D_A$), the mixing efficiency is increased to approximately 72% of the theoretical maximum. The use of a conventional diffraction-limited f/40 local oscillator beam minimizes alignment requirements because the Airy disc associated with this beam is five times larger than that of the signal beam, and this effectively eliminates the need for critical alignment of the local oscillator beam with respect to the Airy disc of the signal beam.

A laser beacon 46 which is a low data rate, high beamwidth laser beam generator, is provided to generate a beacon beam through optical condensor 48 and field lens 50 to a conventional beam splitter plate 52 located on optical axis 28 between beam combining mirror 23 and detector 14. Beam splitter plate 52 is coated with a material that transmits the incoming signal beam S and local oscillator beams 22 (both at 10.6 microns wavelength) and reflects the beacon beam (at 0.9 micron wavelength). The beacon beam, reflected by plate 52, follows an optical path along the optical axis of collector 12, but in a direction opposite the direction of the incoming signal beam S. The beacon beam is radiated from the collector 12 at the output of pointing mirror 32.

In order to minimize collection of interfering light and other radiant energy, such as the sun, a sun shield 54 is provided at the input (entrance pupil) to pointing mirror 32. Shield 54 also reduces thermal distortion of the pointing mirror surface caused by solar energy concentration on the mirror.

Although the particular dimensions and locations of the elements of collector 12 is a function of particular packaging requirements, the following dimensions have been derived for a 10.6 micron heterodyne laser system:

| PARAMETER | VALUE |
| --- | --- |
| Diameter of primary mirror 24 | 18.50 cm |
| Diameter of secondary mirror 26 | 4.80 cm |
| Diameter of input beam S | 16.50 cm |
| Diameter of exit pupil 18 | 1.92 cm |
| f number of collector 12 | 8.00 |
| f number of primary mirror 24 | 2.22 |
| f number of secondary mirror 26 | 1.94 |
| Focal length of primary mirror 26 | 41.00 cm |
| Focal distances of secondary mirror 26 | 9.291 cm / 30.135 cm |
| Magnification | 4.41 |
| Separation: primary/secondary | 50.292 cm |
| Spectral region | 10.60 microns |
| Field coverage | ±0.13° |
| Input acquisition field | ±10° |
| Image diameter | 0.60 cm |
| Distance from center of exit pupil 18 | |
| Pupil to: a) image motion compensator 20b | −1.27 cm |
| b) image motion compensator 20a | 1.27 cm |

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In an optical laser system, an optical collector comprising a paraboloidal primary reflector; an ellipsoidal secondary reflector, said secondary reflector and said primary reflector facing each other and located on an optical axis, a focus of said secondary reflector coinciding with a focus of said primary reflector; folding reflector means located on said optical axis for forming a folded optical axis containing a system focus of said collector; and laser beam detector means located on said folded axis in proximity to said system focus for detecting an incoming signal beam.

2. The system of claim 1, including a pointing reflector located on said optical axis, said pointing reflector containing a central aperture for passing said incoming signal beam between said primary and secondary reflectors.

3. The system of claim 2, wherein said pointing reflector is planar and oriented at approximately 45° with respect to said optical axis.

4. The system of claim 1, wherein said folding reflector means includes a planar reflector located on said optical axis at the focus of said primary and secondary reflectors, said folding reflectors having a central aperture for passing said incoming beam between said primary and secondary reflectors.

5. The system of claim 1, wherein said folding reflector is oriented at approximately 45° with respect to said optical axis.

6. The system of claim 1, including image motion compensator means located in proximity to an exit pupil of said collector.

7. The system of claim 6, wherein said image motion compensator means is located in proximity to an aperture stop of said collector.

8. The system of claim 1, including local oscillator means for generating a heterodyning signal for mixing with said incoming signal beam.

9. The system of claim 8, wherein said local oscillator means includes a laser beam generator.

10. The system of claim 9, wherein said laser beam generator generates a local oscillator beam having a greater f/number than said signal beam for substantially reducing alignment requirements of said local oscillator beam.

11. The system of claim 9, further including a beam combining reflector located between aid laser beam generator and said detector means, said beam combining reflector combining the output of said laser beam generator and said incoming beam.

12. The system of claim 1, including a laser beacon source for generating a beacon signal from said collector.

13. The system of claim 1, including shielding means at an input pupil of said collector for shielding interfering radiant energy.

14. The system of claim 1, wherein a diameter of said detector means is approximately 72% of a diameter of an Airy disc associated with said system focus.

* * * * *